(12) United States Patent
Whitney et al.

(10) Patent No.: US 10,057,365 B1
(45) Date of Patent: Aug. 21, 2018

(54) ASYNCHRONOUS PROVISION OF RESOURCE STATUS DATA

(71) Applicant: Amazon Technologies, Inc., Seattle, WA (US)

(72) Inventors: David Whitney, Seattle, WA (US); Donley Ray P'Simer, Seattle, WA (US); Asa Denton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 14/749,273

(22) Filed: Jun. 24, 2015

(51) Int. Cl.
H04L 29/08 (2006.01)

(52) U.S. Cl.
CPC .......... H04L 67/2842 (2013.01); H04L 67/10 (2013.01)

(58) Field of Classification Search
CPC ............. H04L 12/2838; H04L 43/0882; H04L 67/2842; H04L 67/10; G06F 15/16; G06F 17/248
USPC .................................. 709/203, 219; 370/252
See application file for complete search history.

(56) References Cited

U.S. PATENT DOCUMENTS

| | | | | |
|---|---|---|---|---|
| 5,778,206 A * | 7/1998 | Pain | ..................... | G06F 11/1625 710/305 |
| 7,945,750 B2 * | 5/2011 | Arakawa | ............. | G06F 11/2064 711/151 |
| 8,694,698 B2 * | 4/2014 | Mizuno | ................. | G06F 3/0611 710/33 |
| 2006/0271815 A1 * | 11/2006 | Mizuno | ............... | G06F 11/2066 714/6.12 |
| 2007/0245106 A1 * | 10/2007 | Maki | .................... | G06F 11/2069 711/162 |
| 2012/0151358 A1 * | 6/2012 | Joanny | .................. | G06F 9/5011 715/736 |
| 2013/0039207 A1 * | 2/2013 | Vadasz | ................ | H04L 12/5601 370/252 |
| 2013/0311780 A1 * | 11/2013 | Besehanic | ............ | H04L 9/3247 713/176 |
| 2014/0244721 A1 * | 8/2014 | Taine | ...................... | H04L 65/40 709/203 |
| 2016/0196508 A1 * | 7/2016 | Richter | .................. | G06Q 10/02 705/5 |

* cited by examiner

Primary Examiner — Tesfay Yohannes
(74) Attorney, Agent, or Firm — Robert C. Kowert; Meyertons, Hood, Kivlin, Kowert & Goetzel, P.C.

(57) ABSTRACT

Technologies are disclosed herein for asynchronous provision of resource status data. A resource status application can submit a request to a resource status service for status data regarding one or more computing resources provided by network services in a service provider network. In response thereto, the resource status service can submit synchronous requests to the network services for the status data. The resource status service can also provide a reply to the resource status application that includes an identifier (ID) that can be utilized to retrieve all or a portion of the status data at a future time. The reply might also specify a period of time that the resource status application is to wait before submitting another request for the status data to the resource status service. Subsequently, the resource status application can submit additional requests for the status data to the resource status service that include the identifier.

20 Claims, 12 Drawing Sheets

ASYNCHRONOUS PROVISION OF RESOURCE STATUS DATA

BACKGROUND

Network-based service provider networks exist that allow customers to purchase and utilize various types of computing resources on a permanent or as-needed basis. For example, a service provider network may permit customers to purchase and utilize computing resources such as virtual machine ("VM") instances, data storage resources, database resources, networking resources, network services, and other types of computing resources. Customers may configure the computing resources provided by a service provider network to implement desired functionality, such as to provide a network-based application or another type of functionality.

Managing computing resources provided by network services in a service provider network such as those described above can present unique technical challenges. For example, and without limitation, it may be challenging to obtain information describing the operational status of computing resources from a large number of network services executing on different server computers in different data centers in a service provider network. Moreover, it might take some network services a relatively long period of time to respond to requests for status data regarding the computing resources that they provide. During this period of time, client applications requesting the resource status data typically have to maintain open network connections, which might reduce the ability of the service provider network to respond to other requests for information about the status of computing resources.

The disclosure made herein is presented with respect to these and other considerations.

DETAILED DESCRIPTION

Figure 1:
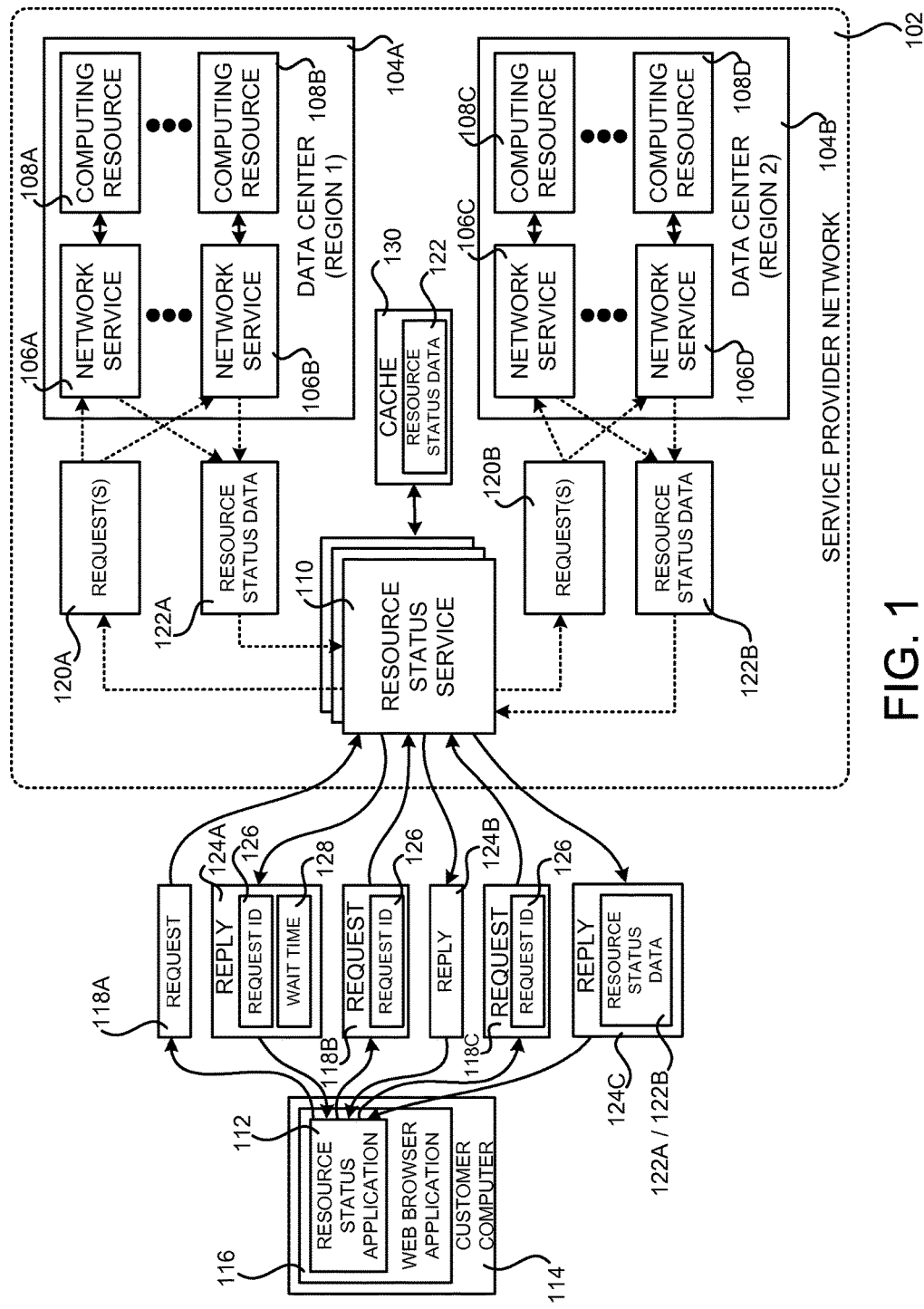
FIG. 1 is a system architecture diagram showing aspects of the configuration and operation of a resource status service that is configured to asynchronously provide resource status data in one configuration disclosed herein.

The following detailed description is directed to technologies for asynchronously providing resource status data. Through an implementation of these technologies, client applications can request and receive resource status data that describes the operational status of computing resources in a service provider network from a resource status service in a manner that does not require the clients to maintain a persistent network connection to the resource status service while the resource status data is obtained from the network services that provide the resources. Rather, the resource status data can be provided to requesting clients once all or even just a portion of the resource status data has been obtained.

As discussed briefly above, the various technologies disclosed herein may be implemented in conjunction with a service provider network. A service provider network may permit customers to purchase and utilize computing resources (which might be referred to herein simply as "resources") such as VM instances, data storage resources, database resources, networking resources, network services, and other types of computing resources. The computing resources are provided by network services executing in the service provider network.

In order to enable the functionality disclosed herein, a resource status service is provided in one configuration. The resource status service executes in the service provider network and is configured to receive and respond to requests for resource status data (which might be referred to herein simply as "status data"). The resource status data describes aspects of the operational status of computing resources provided by network services executing in the service provider network. The resource status service can expose a suitable interface, such as a network services application programming interface ("API"), through which clients can request resource status data for a collection of computing resources.

An application program, which might be referred to herein as a "resource status application", can also be provided that is configured to obtain and display the resource status data in a suitable graphical user interface ("GUI") or in another manner. The resource status application can submit a request to the resource status service for resource status data regarding one or more computing resources provided by network services in a service provider network, such as all or a group of resources assigned to a particular customer of the service provider network.

In response to receiving a request for resource status data from the resource status application, the resource status service can submit synchronous requests to the appropriate network services for the requested resource status data. In some configurations, the network services from which the resource status data is obtained are executing in different data centers located in different geographic regions.

The resource status service can also provide a reply to the resource status application that includes a unique identifier ("ID") that can be utilized to retrieve all or a portion of the resource status data from the resource status service at a future time. The reply might also specify a period of time that the resource status application is to wait before submitting another request for the resource status data to the resource status service. When the resource status service receives the resource status data from the network services, the resource status service stores the resource status data in a cache that is accessible to multiple instances of the resource status service. The cache entries may be associated with the ID assigned to the request.

Subsequently, the resource status application can submit additional requests for the resource status data to the resource status service that include the ID provided in response to the initial request. In response to such requests, the resource status service can utilize the supplied ID to determine if all or a portion of the requested resource status data is in the cache.

In some configurations, the resource status service will wait until all of the requested resource status data has been obtained and stored in the cache (i.e. for a multitude of computing resources) before providing the aggregated resource status data to the resource status application in reply to a request. In other configurations, the resource status service will provide partial results stored in the cache to the resource status application as the partial results are returned from the network service.

With each reply to the resource status application, the resource status service might also specify a period of time that the resource status application is to wait before submitting another request for the resource status data. The period of time might be increased exponentially or in another manner in some configurations. Additional details regarding the various components and processes described briefly above for asynchronous provision of resource status data will be presented below with regard to FIGS. 1-12.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. As mentioned briefly above, the configurations described herein may be practiced in distributed computing environments, such as a service provider network, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a service provider network 102 that is configured to provide functionality for asynchronous provision of resource status data. As discussed briefly above, the service provider network 102 is a distributed network through which customers and/or other users can utilize computing resources 108 (which might be referred to herein simply as "resources"), such as VM instances and/or other types of computing resources, on a permanent or as-needed basis.

Each type or configuration of a computing resource 108 may be available from the service provider network 102 in different sizes. For example, a service provider might offer physical hosts, VM instances or other types of data processing resources that are available for purchase and use that have many different configurations of processor capabilities, main memory, disk storage, and operating system. A service provider operating the service provider network 102 might also offer other types of computing resources 108 for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources 108 or services on a permanent or as-needed basis. The computing resources 108 might also include, but are not limited to, VM instances and images, security groups, option groups, gateways, option sets, network access control lists ("ACLs"), subnets, storage buckets, network interfaces, snapshots, spot market requests, and storage volumes.

The service provider operating the service provider network 102 might also charge a fee for utilization of the computing resources 108 to a customer that creates and uses the resources. The fee charged for a particular computing resource 108 might be based upon the type and/or configuration of the computing resource 108. For example, in the case of a data processing computing resource, like a VM instance, the fee for use of the computing resource 108 might be charged based upon the amount of time the computing resource 108 is utilized. In the case of a data storage computing resource 108, the fee might be computed based upon the amount of data stored and/or the amount of data transferred into or out of the computing resource 108. The fees for other types of resources 108 might also be based upon other considerations. A service provider might also utilize various purchasing models to determine the amount to charge a customer for use of resources 108 provided by the service provider network 102.

The resources 108 described above may be provided in one particular implementation by one or more data centers 104A and 104B operated by the service provider. As known to those skilled in the art, data centers 104 are facilities utilized to house and operate computer systems and associated components. Data centers 104 also typically include redundant and backup power, communications, cooling, and security systems. The data centers 104A and 104B might be located in geographically disparate regions, and might also be connected to various other facilities, such as co-location facilities, and various wide area networks ("WANs"), such as the Internet. Additional details regarding the configuration and operation of the data centers 104A and 104B are provided below with regard to FIGS. 9 and 10. In this regard, it should be appreciated that while only two data centers 104 are shown in FIG. 1, more or fewer data centers 104 might be utilized in other configurations.

The resources 108 described briefly above might also be provisioned and de-provisioned as needed in an automated fashion. For example, the service provider network 102 might be configured to create a new instance of a computing resource 108, such as a VM instance, in response to an increase in demand for a network service or other condition. Other types of computing resources 108 might also be provisioned and de-provisioned in a similar manner. Services in the service provider network 102 might also provide functionality for automatically scaling and/or de-scaling resources 108 based upon demand for the resources and/or other factors.

A customer or potential customer of the service provider network 102 might utilize an appropriate computing system, such as the customer computer 114, to communicate with the service provider network 102 over an appropriate data communications network (not shown in FIG. 1). In this way, a customer of the service provider network 102 can configure various aspects of the operation of the computing resources 108 provided by the service provider network 102, or to otherwise control any computing resources 108 being utilized by the customer. For example, and without limitation, a computing system utilized by a customer of the service provider network 102, such as the customer computer 114, might be utilized to purchase computing resources 108 in the service provider network 102, to configure aspects of the operation of the computing resources 108 through a management console (not shown in FIG. 1) or other type of interface, to access and utilize functionality provided by the various services and systems described herein, and/or to perform other types of functionality with regard to the operation of the computing resources 108 provided by the service provider network 102.

The customer computer 114 might be any type of computing device capable of connecting to the service provider network 102 via a suitable data communications network such as, but not limited to, a laptop or desktop computer, a tablet computing device, a server computer, or a smartphone. Administrative users employed by the operator of the service provider network 102, such as administrators managing the operation of the service provider network 102, might also connect with, manage, and utilize resources 108 provided by the service provider network 102 in a similar fashion.

As discussed briefly above, the service provider network 102 might also be configured to execute various types of network services to provide the computing resources 108. For example, and without limitation, the service provider network 102 may provide an on-demand computing service (described in greater detail below) for providing VM instances on-demand, a data storage service for providing data storage resources and, potentially, other types of network-accessible services 106 for providing other types of computing resources 108. In the example shown in FIG. 1, for instance, the network service 106A provides the computing resource 108A, the network service 106B provides the computing resource 108B, the network service 106C provides the computing resource 108C, and the network service 106D provides the computing resource 108D. These and other network services 106 and their associated computing resources 108 may be utilized together to implement various types of network-based applications in the service provider network 102.

The network services 106 can also be configured to expose interfaces, such as a network services API, through which other services can obtain resource status data 122 that describes aspects of the operational status of the computing resources 108 that they provide. For instance, a network service 106 configured to provide VM instances, might expose an API through which callers can obtain information regarding the operational status of the VM instances. In a similar fashion, a network service 106 that provides storage resources can provide resource status data 122 regarding the storage resources. Other types of network services 106 can provide other types of resource status data 122 for other types of computing resources 108. Additional details regarding one implementation of the service provider network 102 and the various types of network services 106 that might be provided by the service provider network 102 will be discussed below with regard to FIGS. 9-12.

It should be appreciated that the various examples of resource status data 122 described above are merely illustrative and that the term "resource status data" as used herein encompasses virtually any type of data that can be provided by network services 106 operating in a service provider network 102. For example, and without limitation, resource status data 122 includes, but is not limited to, data describing the status of the network services 106 or the computing resources 108 that they provide, data describing relationships between the network services 106 or the computing resources 108 that they provide, objects created or maintained by the network services 106 or the computing resources 108 that they provide, or other data or metadata pertaining to the network services 106 or the computing resources 108 that they provide. Accordingly, the resource status data 122 might also be referred to herein as "resource metadata 122."

As shown in FIG. 1 and discussed briefly above, a resource status service 110 is also executed in the service provider network 102 in one configuration. The resource status service 110 is a network service that executes in the service provider network 102 and is configured to receive and respond to requests for resource status data 122. As with the network services 106, the resource status service 110 can expose a suitable interface, such as a network services API, through which client applications or services can request resource status data 122 for a collection of computing resources 108, such as all or a group of computing resources 108 purchased by a customer of the service provider network 102.

A resource status application 112 can also be provided that is configured to obtain and display the resource status data 122 in a suitable GUI or in another manner. In one configuration, the resource status application 112 is implemented as a web application that executes all or in part within a Web browser application 116. Other types of applications that execute natively or in another manner might, however, utilize the functionality provided by the resource status service 110. Other network services 106 executing within the service provider network 102 might also utilize the functionality provided by the resource status service 110, which is described in detail below.

In one configuration, the resource status application 112 submits a request 118A to the resource status service 110 for resource status data 122 regarding one or more computing resources 108 provided by network services 106 in the service provider network 102, such as all or a group of resources 108 assigned to a particular customer of the service provider network 102. The request 118A may identify the resources 108 for which resource status data 122 is requested.

In response to receiving the request 118A for resource status data 122 from the resource status application 112, the resource status service 110 can submit synchronous requests 120 to the appropriate network services 106 for the requested resource status data 122. For instance, in the example shown in FIG. 1, the resource status service 110 has submitted requests 120A and 102B to network services 106A-106D executing in the data centers 104A and 104B. In some configurations, the network services 106 from which the resource status data 108 is obtained are executing in different data centers 104 located in different geographic regions. For example, the data center 104A might be located in North America, while the data center 104B is located in Japan.

If the network services 106 respond with the requested resource status data 122 within a threshold period of time (e.g. within a second or two), the resource status service 110 might provide a reply to the request 118A that includes the requested resource status data 122. However, as discussed above, it is not uncommon for the network services 106 to take a relatively long period of time to respond to such requests. In this case, the resource status service 110 can provide a reply 124A to the request 118A that does not include the requested status data 122, but that includes a unique ID (shown in FIG. 1 as the "request ID 126") corresponding to the request 118A. The resource status application 112 can utilize the request ID 126 to retrieve all or a portion of the requested resource status data 122 from the resource status service 110 at a future time. The reply 124A might also specify a period of time (the "wait time 128" in FIG. 1) that the resource status application 112 is to wait before submitting another request 118 for the resource status data 122 to the resource status service 110.

When the resource status service 110 receives the resource status data 122 from the network services 106 from which it was requested, the resource status service 110 stores the resource status data 122 in a cache 130 that is accessible to multiple instances of the resource status service 110. The cache 130 entries may be associated with the request ID 126 assigned to the request 118A. The cache 130 is implemented as an in-memory cache that is accessible to multiple instances of the resource status service 110 in one configuration. For example, the cache 130 might be implemented using the MEMCACHED distributed in-memory cache. Other types of caches might also be utilized. In this regard, it should be appreciated that many instances of the resource status service 110 can be utilized and that each of the instances of the resource status service 110 can process any request for resource status data 122 in the manner described herein.

After the specified wait time 128 has elapsed, the resource status application 112 can submit another request 118B for the resource status data 122 to the resource status service 110. As shown in FIG. 1, the request 118B include the request ID 126 provided in the reply 124A to the initial request 118A. In response to the request 118B, the resource status service 110 can utilize the supplied request ID 126 to determine if all or a portion of the requested resource status data 122 is contained in the cache 130.

In the example shown in FIG. 1, the resource status service 110 waits until all of the requested resource status data 122 has been obtained and stored in the cache 130 (i.e. for a multitude of computing resources 108) before providing the aggregated resource status data 122 (i.e. the resource status data 122A and 122B) to the resource status application 110 in reply to a request 118. Details regarding this configuration are provided with regard to FIGS. 2-4. In other configurations, the resource status service 110 will provide partial results stored in the cache 130 to the resource status application 112 as the partial results are returned from the network services 106. Additional details regarding this configuration are provided below with regard to FIGS. 5-8.

In the example shown in FIG. 1, all of the requested resource status data 122 has not yet been placed in the cache 130 at the time the request 118B is received. Accordingly, the resource status service 110 response with a reply 124B instructing the resource status application 112 to call back at a later time. With each reply 124 to the resource status application 112, the resource status service 110 might also specify a new period of time that the resource status application 112 is to wait before submitting another request 118 for the resource status data 112. The wait time 128 might be increased exponentially with each reply 124 (e.g. 2 s, 4 s, 8 s, etc.) or in another manner in some configurations.

In the example shown in FIG. 1, the resource status application 112 submits a third request 118C for the resource status data 122. The request 118C also includes the request ID 126. In this example, the requested resource status data 122 has been placed in the cache 130 at the time the third request 118C is received. Accordingly, the resource status service 110 generates a reply 124C to the request 118C that includes the requested resource status data 122A and 122B. Additional details regarding this process will be provided below with regard to FIGS. 2-4.

Figure 2:
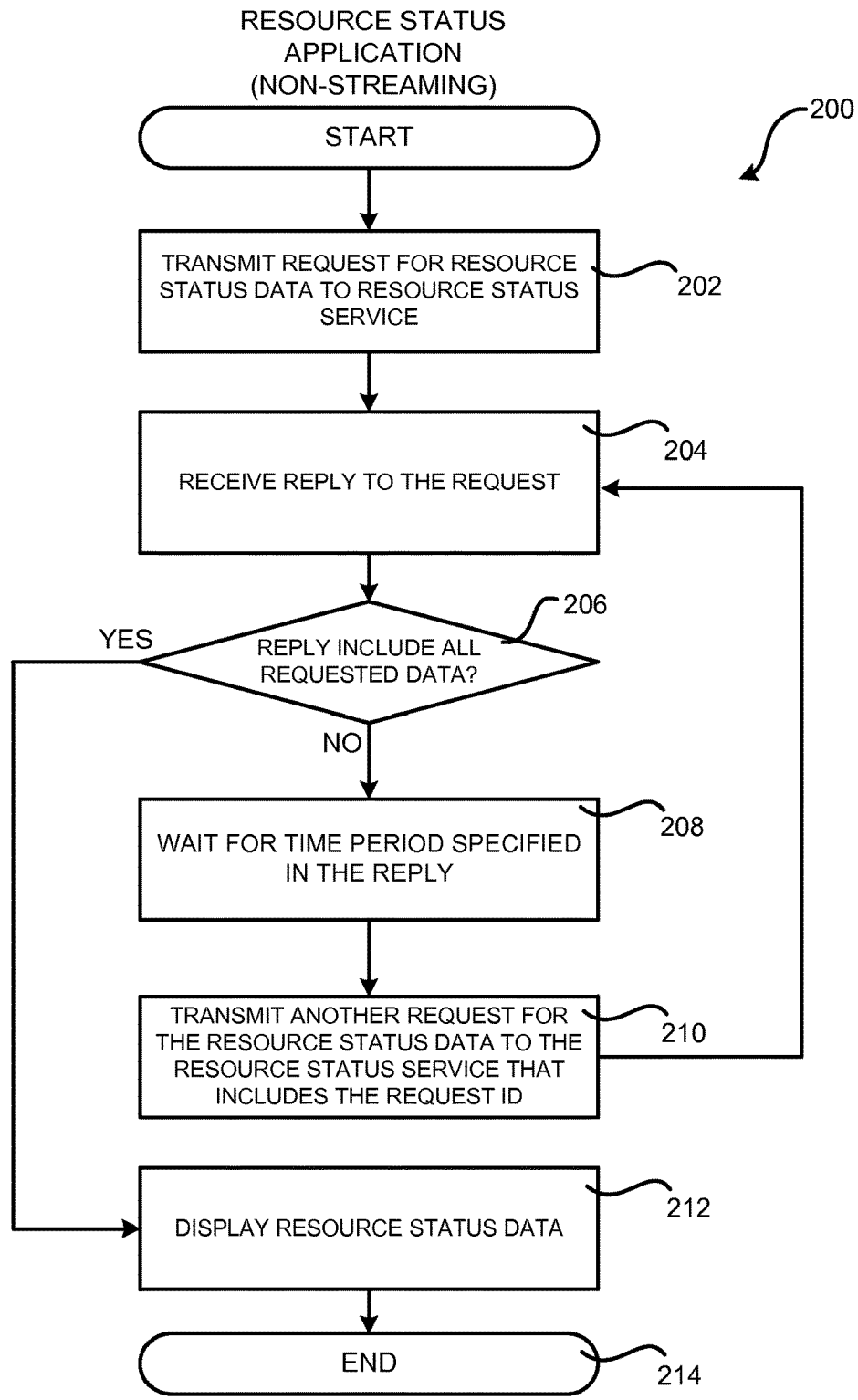
FIG. 2 is a flow diagram showing a routine that illustrates aspects of the operation of a resource status application configured to obtain resource status data from the resource status service, in one particular configuration disclosed herein.

FIG. 2 is a flow diagram showing a routine 200 that illustrates aspects of the operation of the resource status application 112 for obtaining resource status data 122 from the resource status service 110, in one particular configuration disclosed herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the resource status application 110 transmits a request 118 for resource status data 122 for resources 108 in the service provider network 102. If the request 118 is an initial request, the request 118 will identify the particular resource status data 122 that is requested. If the request 118 is a subsequent request, the request 118 will include the request ID 126 provided by the resource status service 110 in response to the initial request.

The routine 200 then proceeds from operation 202 to operation 204. At operation 204, the resource status application 112 receives a reply 124 to the request 118 submitted at operation 202. As discussed above, the reply 124 provided by the resource status service 110 may provide a request ID 126 and/or a wait time 128 if all of the requested resource status data 122 is not yet available in the cache 130. If all of the requested resource status data 122 is available in the cache 130, the reply 124 will include the requested resource status data 122.

From operation 204, the routine 200 proceeds to operation 206. At operation 206, the resource status application 112 determines whether the reply 124 includes the requested resource status data 122. If the reply 124 includes the requested resource status data, the routine 200 proceeds from operation 206 to operation 212, where the resource status application 112 displays the resource status data 212 in an appropriate GUI. The resource status application 112 might also, or alternatively, perform other operations on the resource status data 122. The routine 200 then proceeds from operation 212 to operation 214, where it ends.

If, at operation 206, the resource status application 112 determines that the reply 124 received at operation 204 does not include the requested resource status data 122, the routine 200 proceeds from operation 206 to operation 208. At operation 208, the resource status application 112 waits for the time period specified in the reply 128. Once the specified wait time 128 has elapsed, the routine 200 proceeds from operation 208 to operation 210.

At operation 210, the resource status application 112 transmits another request 118 for the resource status data 122 to the resource status service 110. This request 118 includes the request ID 126 provided by the resource status service 110 in reply to the original request. The routine 200 then proceeds from operation 210 back to operation 204, where additional replies 124 may be received from the resource status service 110 and processed in the manner described above.

Figure 3:
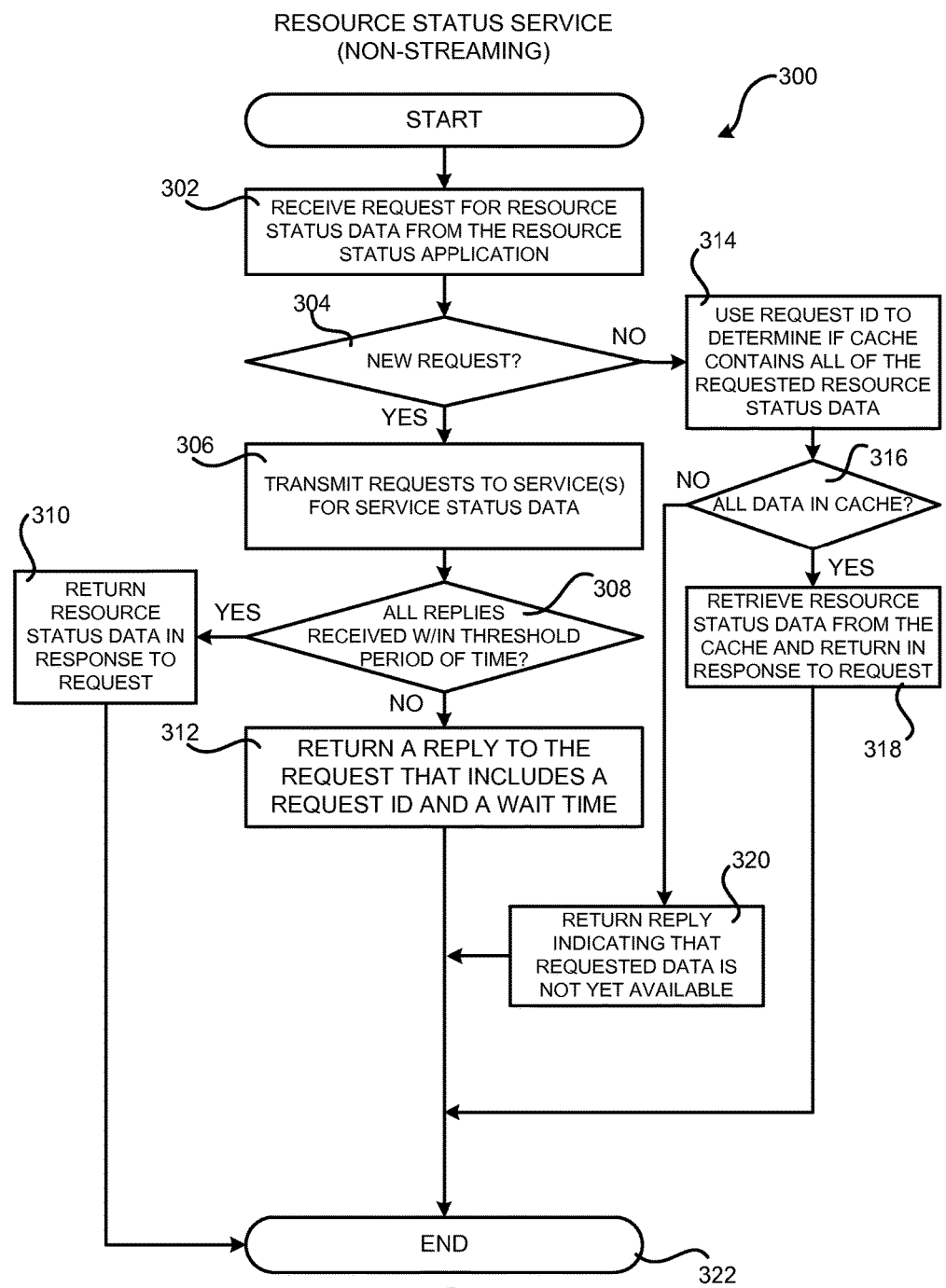
FIG. 3 is a flow diagram showing a routine that illustrates aspects of the operation of the resource status service for asynchronously providing resource status data, in one particular configuration disclosed herein.

FIG. 3 is a flow diagram showing a routine 300 that illustrates aspects of the operation of the resource status service 110 for asynchronously providing resource status data 122, in one particular configuration disclosed herein. The routine 300 begins at operation 300, where the resource status service 110 receives a request 118 for resource status data 122 from the resource status application 112. From operation 302, the routine 300 proceeds to operation 304, where the resource status service 110 determines whether the received request 118 is a new request 118 (i.e. a request 118 that does not include a request ID 126 corresponding to previously made request 118). If the request 118 received at operation 302 is a new request, the routine 300 proceeds from operation 304 to operation 306. If the request 118 received at operation 302 is not a new request 118 (i.e. the request 118 includes a request ID 126), the routine 300 proceed from operation 304 to operation 314.

At operation 306, the resource status service 110 transmits synchronous requests 120 to the appropriate network services 106 for the requested resource status data 122. As discussed above, the resource status service 110 will receive replies to the requests 120 from the network services 106 and place the returned resource status data 122 in the cache 130 as it is returned. As will be discussed in detail below, the resource status service 110 will provide the resource status data 122 to the resource status application 112 when all of the requested resource status data 122 has been returned from the various network services 106 in the configuration illustrated in FIGS. 1-4.

From operation 306, the routine 300 proceeds to operation 308, where the resource status service 110 determines whether replies were received from all of the network services 106 within a threshold period of time (e.g. within one or two seconds). If the resource status data 122 was received from the network services 106 within the threshold period of time, the routine 300 proceeds from operation 308 to operation 310. At operation 310, a reply 124 is provided to the request 118 that includes the requested resource status data 122. In this way, the mechanism described below is not utilized if the network services 106 quickly reply with all of the requested resource status data 122.

If, at operation 308, the resource status service 110 determines that all of the requested resource status data 122 was not returned by the network services 106 within the threshold period of time, the routine 300 proceeds from operation 308 to operation 312. At operation 312, the resource status service 110 returns a reply 124 in response to the request 118 received at operation 302 that includes a request ID 126 corresponding to the request 118. As discussed above, the reply 124 can also specify a wait time 128. The wait time 128 defines a period of time that the resource status application 112 is to wait before submitting another request 118 for the resource status data 122 to the resource status service 110. From operation 312, the routine 300 proceeds to operation 322, where it ends.

As discussed above, if at operation 304 the resource status service 110 determines that the request 118 received at operation 302 is a not a new request, the routine 300 proceeds from operation 304 to operation 314. At operation 314, the resource status service 110 utilizes the request ID 126 supplied in the request 118 to determine if the cache 130 contains all of the requested resource status data 122. If all of the requested resource status data 122 is not in the cache 130, the routine 300 proceeds from operation 316 to operation 320. At operation 320, the resource status service 110 returns a reply 124 to the request 118 indicating that the requested resource status data 122 is not yet available. As discussed above, the reply 124 might specify a wait time 128.

If, at operation 316, the resource status service 110 determines that all of the requested resource status data 122 is contained in the cache 130, the routine 300 proceeds from operation 316 to operation 318. At operation 318, the resource status service 110 retrieves the resource status data 122 from the cache 130 and provides a reply 124 to the request 118 received at operation 302 that includes the requested resource status data 122. The resource status service 110 will also invalidate the entries in the cache 130 for the resource status data 122 and invalidate the request ID 126. The routine 300 then proceeds from operation 318 to operation 322, where it ends.

Figure 4:
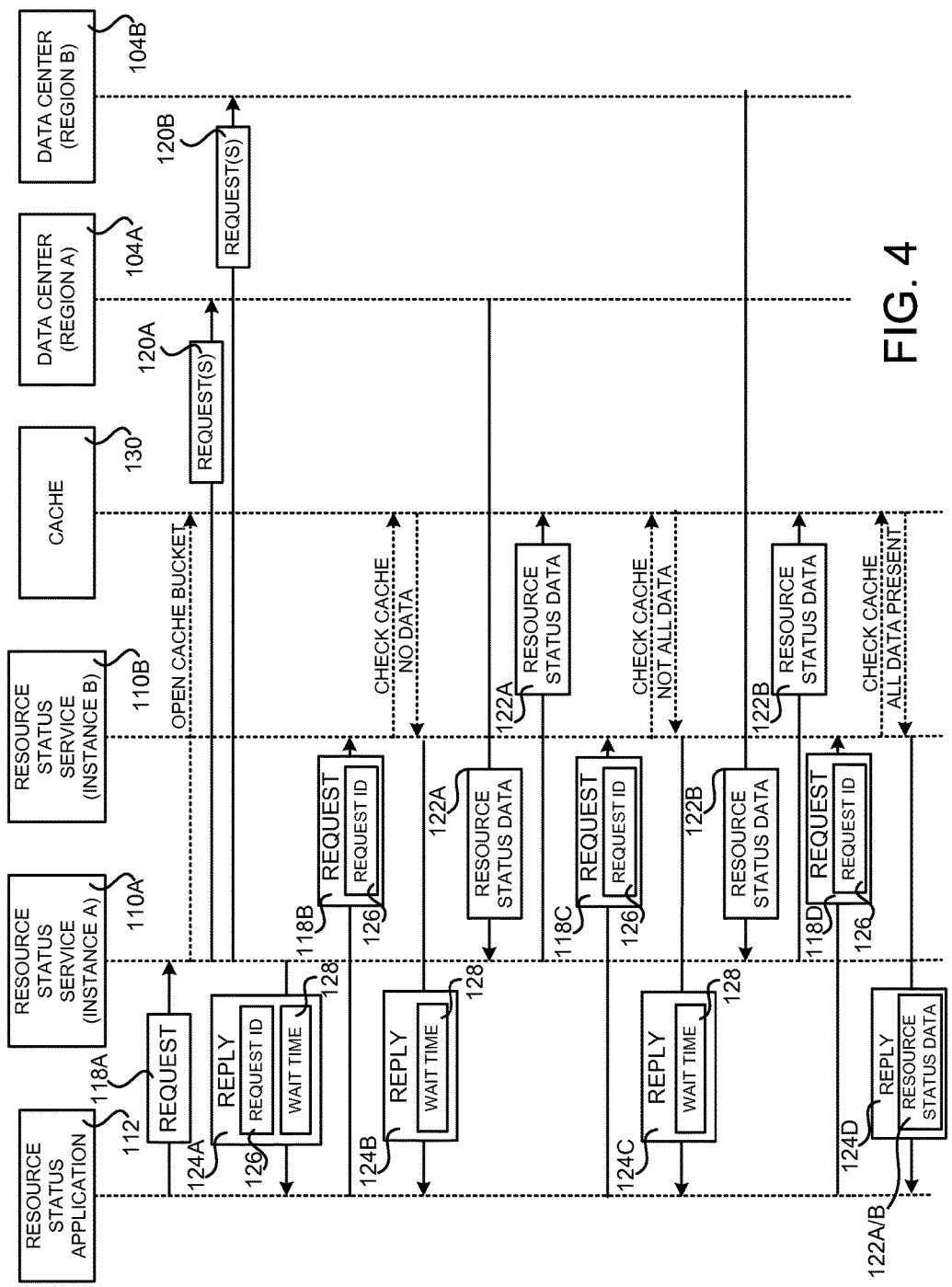
FIG. 4 is a timing diagram showing an example interaction between the resource status application, the resource status service, a cache, and network services executing in two data centers, according to one configuration disclosed herein.

FIG. 4 is a timing diagram showing an example interaction between the resource status application 112, the resource status service 110, the cache 130, and network services 106 executing in two data centers 104A and 104B, according to one configuration disclosed herein. In the example shown in FIG. 4, the resource status application 112 submits a request 118A to a first instance of the resource status service 110A for resource status data 122 for computing resources 108 in the data centers 104A and 104B. As discussed above, the request 118A may identify the resources 108 for which resource status data 122 is requested.

In response to receiving the request 118A for resource status data 122 from the resource status application 112, the first instance of the resource status service 110A can submit synchronous requests 120A and 120B to the appropriate network services 106 executing in the data centers 104A and 104B, respectively, for the requested resource status data 122. For instance, in the example shown in FIG. 4, the resource status service 110 has submitted requests 120A and 102B to network services 106 executing in the data centers 104A and 104B.

As discussed above, if the network services 106 respond with the requested resource status data 122 within a threshold period of time (e.g. within a second or two), the resource status service 110 might provide a reply to the request 118A that includes the requested resource status data 122. However, as discussed above, it is not uncommon for the network services 106 to take a relatively long period of time to respond to such requests. In this case, the resource status service 110 provides a reply 124A to the request 118A that includes a request ID 126 corresponding to the request 118A. The reply 124A also specifies a wait time 128 that the resource status application 112 is to wait before submitting another request 118 for the resource status data 122 to the resource status service 110.

After the wait time 128 specified in the reply 124A has elapsed, the resource status application 112 submits a second request 118B for the resource status data 122 to the resource status service 110. The request 118B includes the request ID 126 provided in the reply 124A to the initial request 118A. In response to the request 118B, the resource status service 110 utilizes the supplied request ID 126 to determine if all of the requested resource status data 122 is contained in the cache 130.

In the example shown in FIG. 4, all of the requested resource status data 122 has not yet been placed in the cache 130 at the time the request 118B is received. Accordingly, the resource status service 110 responds to the request 118B with a reply 124B instructing the resource status application 112 to call back at a later time. The reply 124B also specifies a wait period 128.

In the example shown in FIG. 4, the network services 106 in the data center 104A provide a portion of the requested resource status data 122A following the reply 124B. In response thereto, the instance of the resource status service 110A places the received portion of the requested resource status data 122A in the cache 130. Subsequently, the resource status application 112 provides a third request 118C for the resource status data 122. In this example, all of the requested resource status data 122 has not yet been placed in the cache 130 at the time the third request 118C is received. Accordingly, the resource status service 110 responds with a reply 124C instructing the resource status application 112 to continue waiting. The reply 124C might also specify a new wait time 128.

Subsequent to the reply 124C, the network services 106 in the data center 104B provide a portion of the requested resource status data 122B. In response thereto, the instance of the resource status service 110A places the received portion of the requested resource status data 122B in the cache 130. Subsequently, the resource status application 112 provides a fourth request 118D for the resource status data 122. The fourth request 118D also includes the request ID 126. In this example, the requested resource status data 122 has been placed in the cache 130 at the time the fourth request 118D is received. Accordingly, the instance of the resource status service 110B generates a reply 124D to the request 118C that includes the requested resource status data 122A and 122B. It should be appreciated that the example shown in FIG. 4 is merely illustrative and that more or fewer request 118/reply 124 exchanges may take place.

Figure 5:
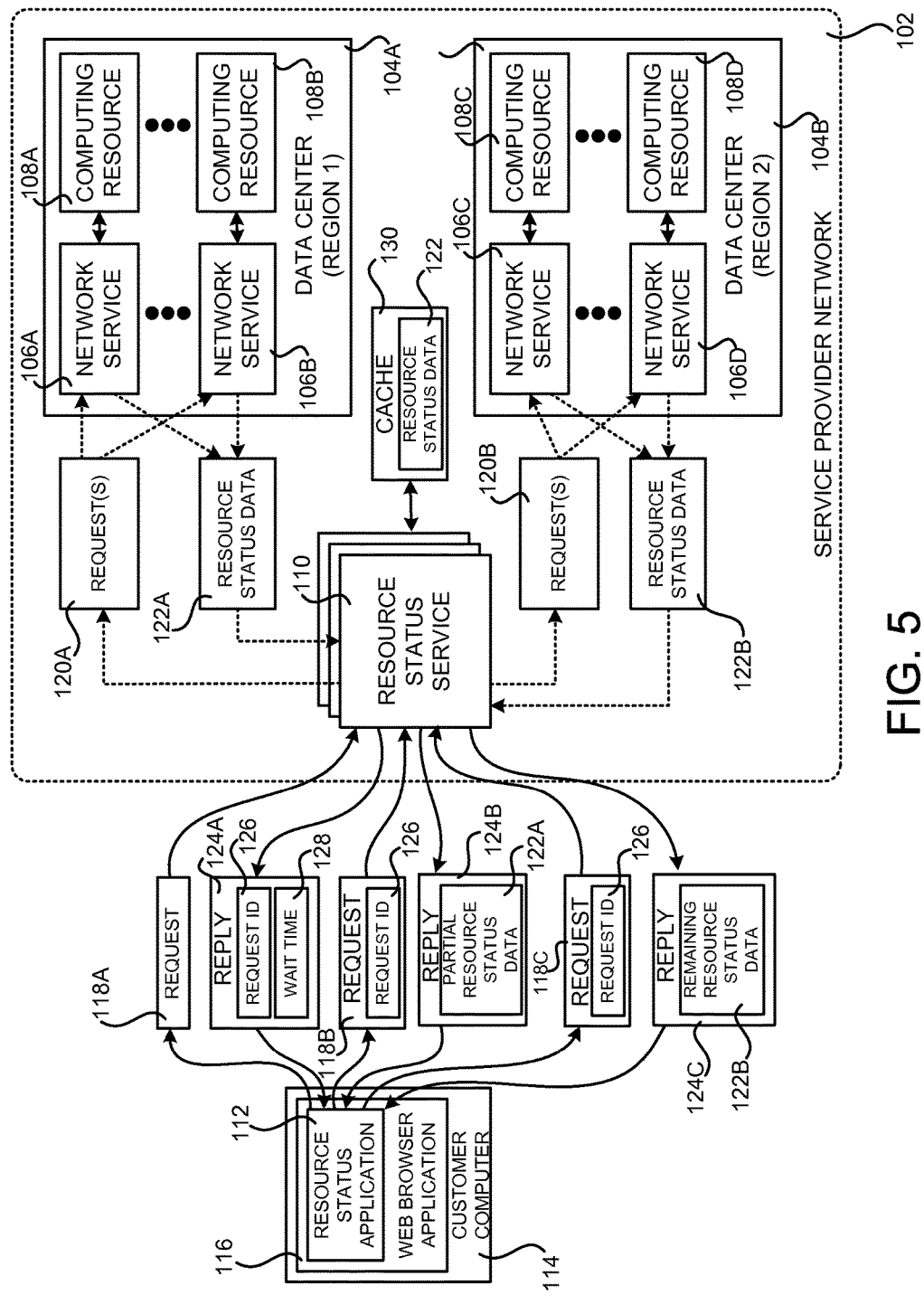
FIG. 5 is a system architecture diagram showing another configuration of the resource status service in which partial resource status data can be provided to client applications.

FIG. 5 is a system architecture diagram showing a configuration of the resource status service 110 in which partial resource status data 122 can be provided to client applications, such as the resource status application 112. In the configuration shown in FIG. 5, the resource status service 110 is configured to provide resource status data 122 in response to requests 118 as the resource status data 122 becomes available in the cache 130 rather than waiting until all of the requested resource status data 122 has been received from the network series 106 and stored in the cache 130.

In the example shown in FIG. 5, for instance, the resource status application 122 has requested resource status data 122A and 122B, which is available from network services 106 executing in the data centers 104A and 104B as in the example shown in FIG. 1. As in the example described above, the resource status data 122A becomes available in the cache 130 sometime after the resource status service 110 transmits the reply 124A. Consequently, the resource status data 122A is provided to the resource status application 112 in a reply 124B to the request 118B. Similarly, the resource status data 122B becomes available sometime following the transmission of the reply 124B. Consequently, the resource status data 122B is provided in a reply 124C to the request 118C. Other partial results might also be provided to the resource status application 112 in a similar manner. The process of providing partial resource status data 122 might be referred to herein as "streaming" the resource status data 122. Additional details regarding this process are provided below with regard to FIGS. 6-8.

Figure 6:
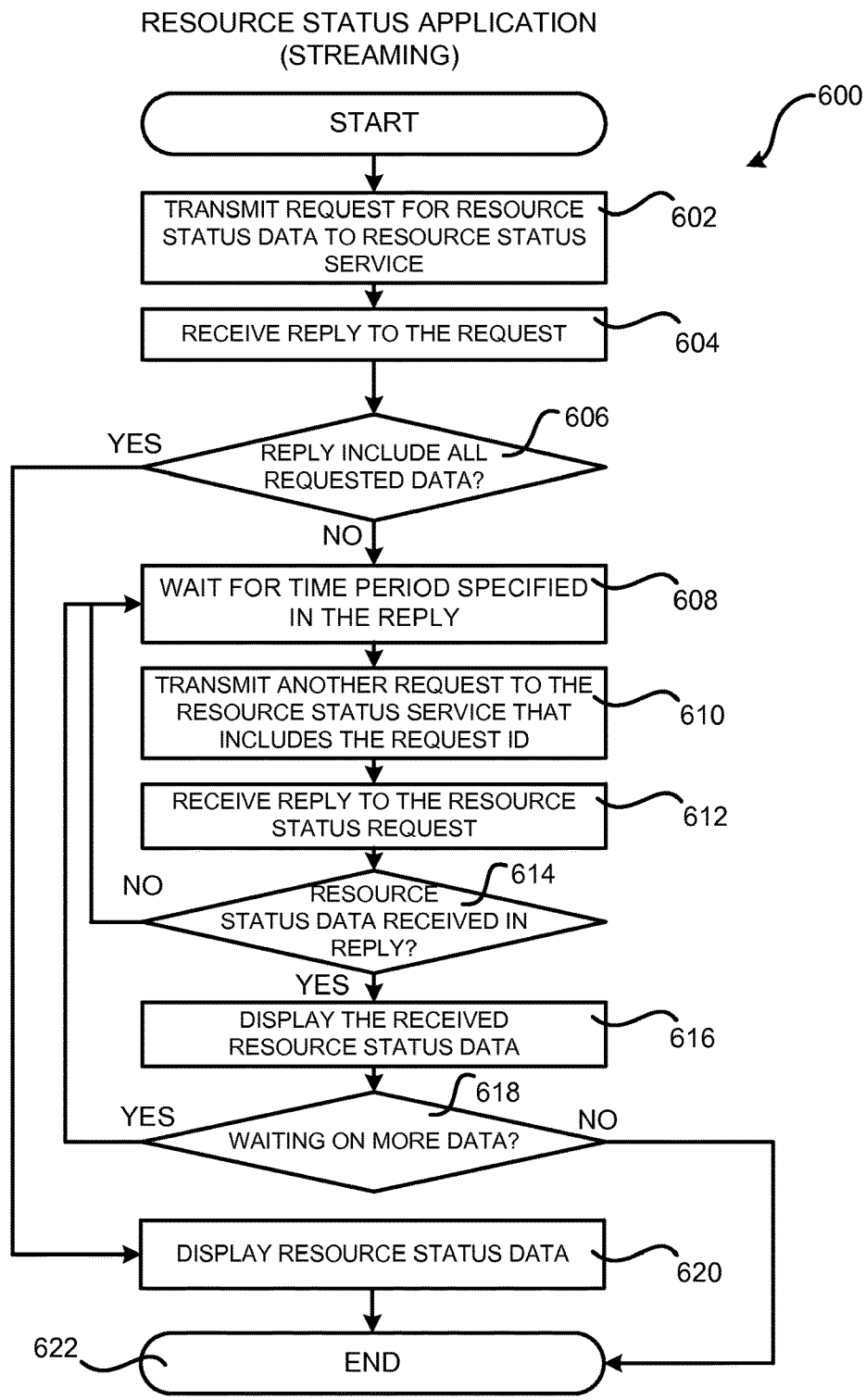
FIG. 6 is a flow diagram showing a routine that illustrates aspects of the operation of the resource status application for obtaining resource status data in another configuration disclosed herein.

FIG. 6 is a flow diagram showing a routine 600 that illustrates aspects of the operation of the resource status application 112 for obtaining resource status data 122 in another configuration disclosed herein. The routine 600 begins at operation 602, where the resource status application 110 transmits a request 118 for resource status data 122 for resources 108 in the service provider network 102. As in the configuration described above, if the request 118 is an initial request, the request 118 will identify the particular resource status data 122 that is requested. If the request 118 is a subsequent request, the request 118 will include the request ID 126 provided by the resource status service 110 in response to the initial request.

The routine 600 then proceeds from operation 602 to operation 604. At operation 604, the resource status application 112 receives a reply 124 to the request 118 submitted at operation 602. As discussed above, the reply 124 provided by the resource status service 110 may provide a request ID 126 and/or a wait time 128 if none of the requested resource status data 122 is available in the cache 130. If any of the requested resource status data 122 is available in the cache 130, the reply 124 will include at least some of the requested resource status data 122.

From operation 604, the routine 200 proceeds to operation 606. At operation 206, the resource status application 112 determines whether the reply 124 includes all of the requested resource status data 122. If the reply 124 includes all of the requested resource status data, the routine 600 proceeds from operation 606 to operation 620, where the resource status application 112 displays the resource status data 212 in an appropriate GUI. The resource status application 112 might also, or alternatively, perform other operations on the resource status data 122. The routine 600 then proceeds from operation 620 to operation 622, where it ends.

If, at operation 606, the resource status application 112 determines that the reply 124 received at operation 204 does not include all of the requested resource status data 122, the routine 600 proceeds from operation 606 to operation 608. At operation 608, the resource status application 112 waits for the time period specified in the reply 128. Once the specified wait time 128 has elapsed, the routine 600 proceeds from operation 608 to operation 610.

At operation 610, the resource status application 112 transmits another request 118 for the resource status data 122 to the resource status service 110. This request 118 includes the request ID 126 provided by the resource status service 110 in reply to the original request. The routine 600 then proceeds from operation 610 to operation 612, where the resource status application 112 receives a reply 124 to the request 118 transmitted at operation 610. The routine 600 then proceeds to operation 614, where the resource status application 112 determines whether any of the requested resource status data 122 is contained in the reply 124 received at operation 612. If no resource status data 122 is included in the reply 124, the routine 600 proceeds back to operation 608, where the resource status application may again wait and transmit another request 118.

If, at operation 614, the resource status application 112 determines that the reply 124 received at operation 612 does include at least some of the requested resource status data 122, the routine 600 proceeds from operation 600 to operation 616. At operation 616, the resource status application 112 may display or otherwise operate on the received resource status data 122. The routine 600 then proceeds from operation 616 to operation 618, where the resource status application 112 determines whether additional resource status data 122 remains to be received. If the resource status application 110 is awaiting additional resource status data 122, the routine 600 proceeds from operation 618 to operation 608 where additional requests 118 may be generated and replies 124 processed in the manner described above. If all of the requested resource status data 122 has been received, the routine 600 proceeds from operation 618 to operation 622, where it ends.

Figure 7:
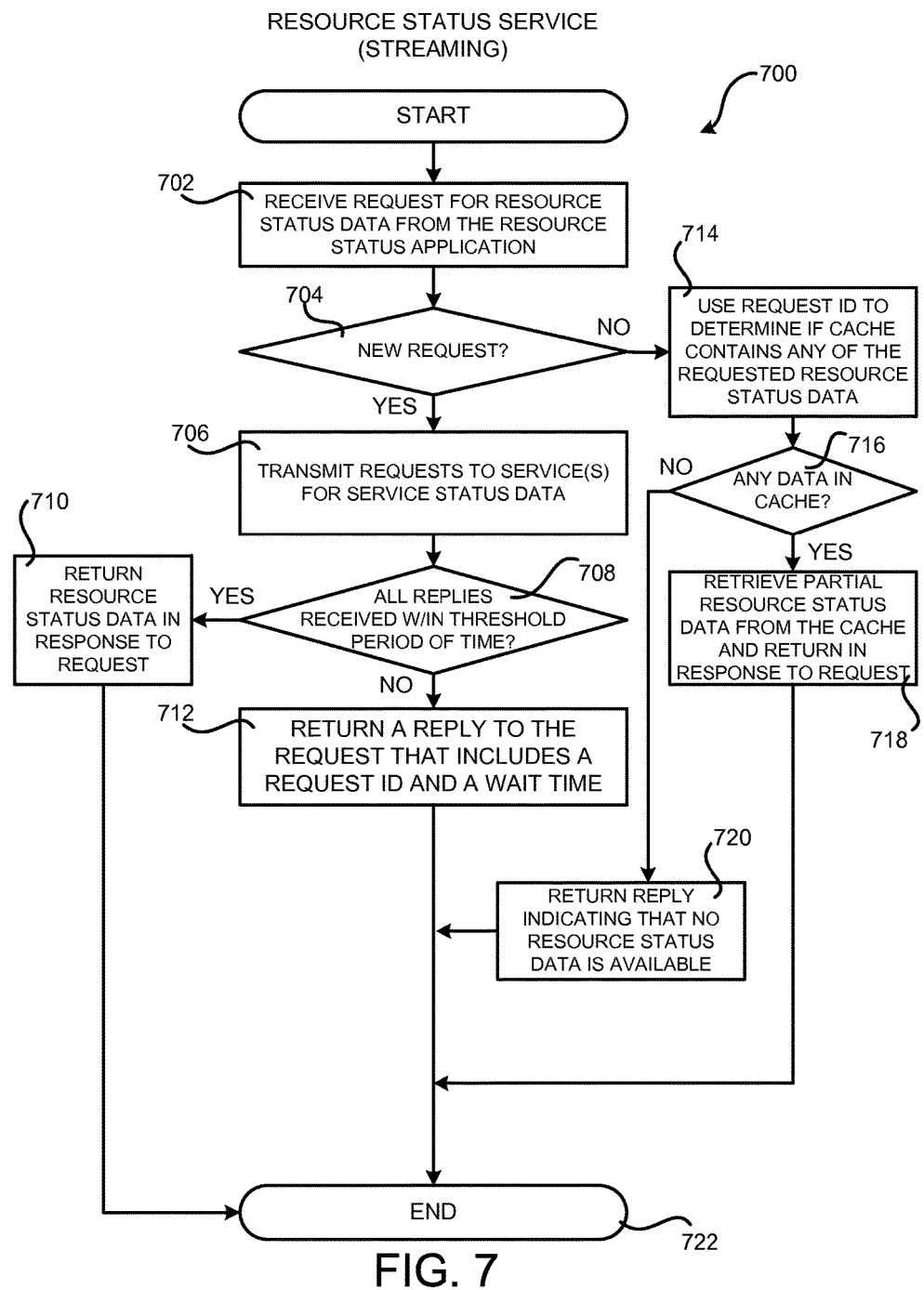
FIG. 7 is a flow diagram showing a routine that illustrates aspects of the operation of the resource status service for asynchronously providing partial resource status data, in one particular configuration disclosed herein.

FIG. 7 is a flow diagram showing a routine 700 that illustrates aspects of the operation of the resource status service 110 for asynchronously providing partial resource status data 122, in one particular configuration disclosed herein. The routine 700 begins at operation 702, where the resource status service 110 receives a request 118 for resource status data 122 from the resource status application 112. From operation 702, the routine 700 proceeds to operation 704, where the resource status service 110 determines whether the received request 118 is a new request 118 (i.e. a request 118 that does not include a request ID 126 corresponding to previously made request 118). If the request 118 received at operation 702 is a new request, the routine 700 proceeds from operation 704 to operation 706. If the request 118 received at operation 702 is not a new request 118 (i.e. the request 118 includes a request ID 126), the routine 700 proceeds from operation 704 to operation 714.

At operation 706, the resource status service 110 transmits synchronous requests 120 to the appropriate network services 106 for the requested resource status data 122. As discussed above, the resource status service 110 will receive replies to the requests 120 from the network services 106 and place the returned resource status data 122 in the cache 130 as it is returned. As will be discussed in detail below, the resource status service 110 will provide partial resource status data 122 to the resource status application 112 as the requested resource status data 122 is returned from the various network services 106.

From operation 706, the routine 700 proceeds to operation 708, where the resource status service 110 determines whether replies were received from all of the network services 106 within a threshold period of time (e.g. within one or two seconds). If the resource status data 122 was received from the network services 106 within the threshold period of time, the routine 700 proceeds from operation 708 to operation 710. At operation 710, a reply 124 is provided to the request 118 that includes all of the requested resource status data 122. In this way, the mechanism described below is not utilized if the network services 106 quickly reply with all of the requested resource status data 122.

If, at operation 708, the resource status service 110 determines that all of the requested resource status data 122 was not returned by the network services 106 within the threshold period of time, the routine 700 proceeds from operation 708 to operation 712. At operation 712, the resource status service 110 returns a reply 124 in response to the request 118 received at operation 702 that includes a request ID 126 corresponding to the request 118. As discussed above, the reply 124 can also specify a wait time 128. From operation 712, the routine 700 proceeds to operation 722, where it ends.

As discussed above, if at operation 704 the resource status service 110 determines that the request 118 received at operation 702 is a not a new request, the routine 700 proceeds from operation 704 to operation 714. At operation 714, the resource status service 110 utilizes the request ID 126 supplied in the request 118 to determine if the cache 130 contains any of the requested resource status data 122. If none of the requested resource status data 122 is in the cache 130, the routine 700 proceeds from operation 716 to operation 720. At operation 720, the resource status service 110 returns a reply 124 to the request 118 indicating that none of the requested resource status data 122 is available. As discussed above, the reply 124 might specify a wait time 128.

If, at operation 716, the resource status service 110 determines that any of the requested resource status data 122 is contained in the cache 130, the routine 300 proceeds from operation 716 to operation 718. At operation 718, the resource status service 110 retrieves the resource status data 122 contained in the cache 130 and provides a reply 124 to the request 118 received at operation 702 that includes at least a portion of the requested resource status data 122. If all of the resource status data 122 has been returned, the resource status service 110 will also invalidate the entries in the cache 130 for the resource status data 122 and invalidate the request ID 126. The routine 700 then proceeds from operation 718 to operation 722, where it ends.

Figure 8:
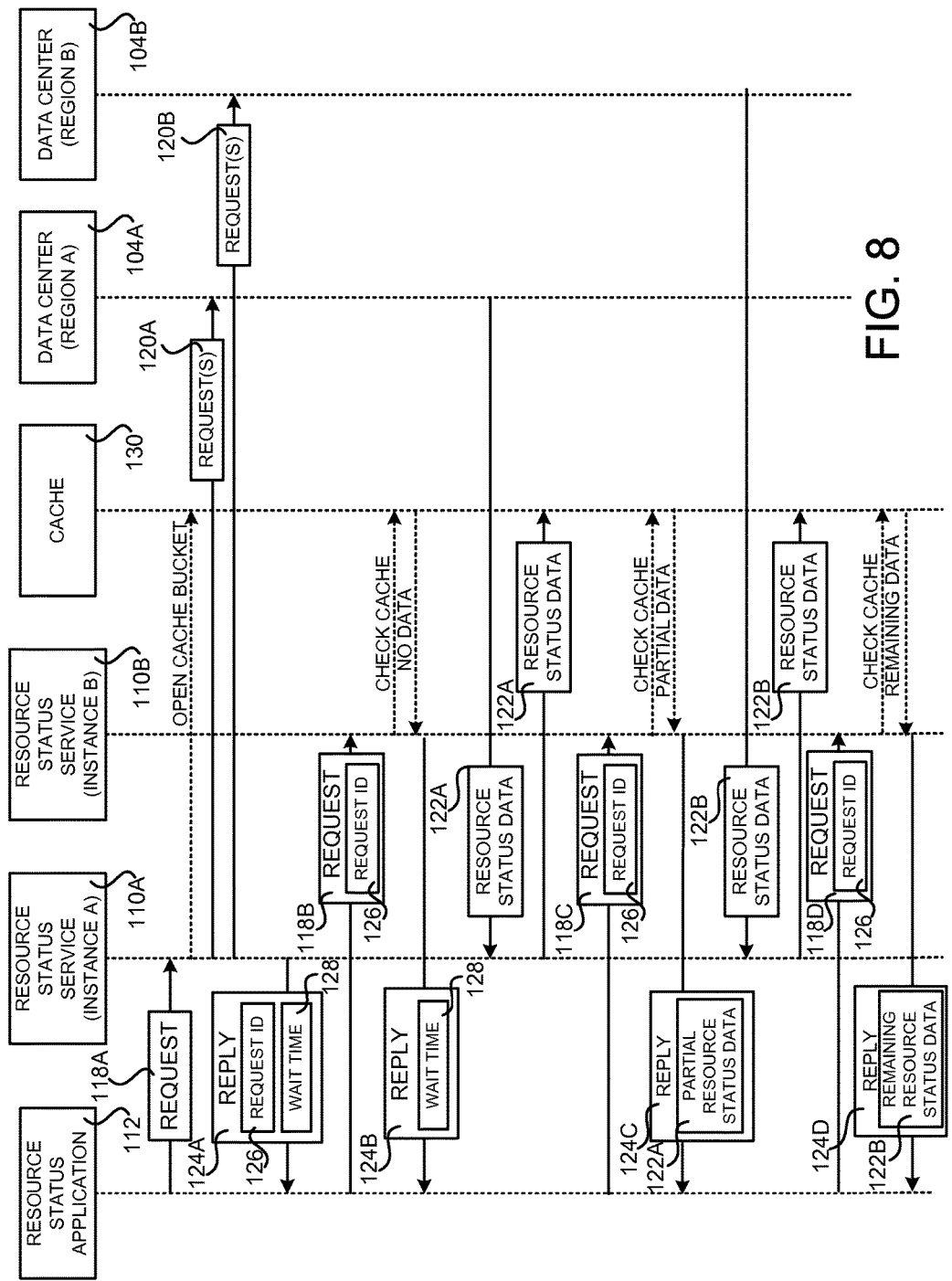
FIG. 8 is a timing diagram showing another example interaction between the resource status application, the resource status service, the cache, and network services executing in two data centers, according to a configuration disclosed herein wherein the resource status service provides partial resource status data.

FIG. 8 is a timing diagram showing another example interaction between the resource status application 112, the resource status service 110, the cache 130, and network services 106 executing in two data centers 104A and 104B, according to a configuration disclosed herein where the resource status service 110 can provide partial resource status data 122. In the example shown in FIG. 8, the resource status application 112 submits a request 118A to a first instance of the resource status service 110A for resource status data 122 for computing resources 108 in the data centers 104A and 104B. As discussed above, the request 118A may identify the resources 108 for which resource status data 122 is requested.

In response to receiving the request 118A for resource status data 122 from the resource status application 112, the first instance of the resource status service 110A submits synchronous requests 120A and 120B to the appropriate network services 106 executing in the data centers 104A and 104B, respectively, for the requested resource status data 122. For instance, in the example shown in FIG. 4, the resource status service 110 has submitted requests 120A and 102B to network services 106 executing in the data centers 104A and 104B, respectively.

As discussed above, if the network services 106 respond with the requested resource status data 122 within a threshold period of time (e.g. within a second or two), the resource status service 110 might provide a reply to the request 118A that includes the requested resource status data 122. However, as discussed above, it is not uncommon for the network services 106 to take a relatively long period of time to respond to such requests. In this case, the resource status service 110 provides a reply 124A to the request 118A that includes a request ID 126 corresponding to the request 118A. The reply 124A also specifies a wait time 128 that the resource status application 112 is to wait before submitting another request 118 for the resource status data 122 to the resource status service 110.

After the wait time 128 specified in the reply 124A has elapsed, the resource status application 112 submits a second request 118B for the resource status data 122 to the resource status service 110. The request 118B include the request ID 126 provided in the reply 124A to the initial request 118A. In response to the request 118B, the resource status service 110 utilizes the supplied request ID 126 to determine if any of the requested resource status data 122 is contained in the cache 130.

In the example shown in FIG. 8, none of the requested resource status data 122 has been placed in the cache 130 at the time the request 118B is received. Accordingly, the resource status service 110 responds to the request 118B with a reply 124B instructing the resource status application 112 to call back at a later time. The reply 124B also specifies a wait period 128.

In the example shown in FIG. 8, the network services 106 in the data center 104A provide a portion of the requested resource status data 122A following the reply 124B. In response thereto, the instance of the resource status service 110A places the received portion of the requested resource status data 122A in the cache 130. Subsequently, the resource status application 112 provides a third request 118C for the resource status data 122. In this configuration, the instance of the resource status service 110B responds with a reply 124C that includes the partial resource status data 122A.

Subsequent to the reply 124C, the network services 106 in the data center 104B provide a second portion of the requested resource status data 122B. In response thereto, the instance of the resource status service 110A places the received portion of the requested resource status data 122B in the cache 130. Subsequently, the resource status application 112 provides a fourth request 118D for the resource status data 122. The fourth request 118D also includes the request ID 126. In this example, the remaining portion of the resource status data 122B has been placed in the cache 130 prior to the time the fourth request 118D is received. Accordingly, the instance of the resource status service 110B generates a reply 124D to the request 118C that includes the requested resource status data 122B. It should be appreciated that the example shown in FIG. 8 is merely illustrative and that more or fewer request 118/reply 124 exchanges may take place.

Figure 9:
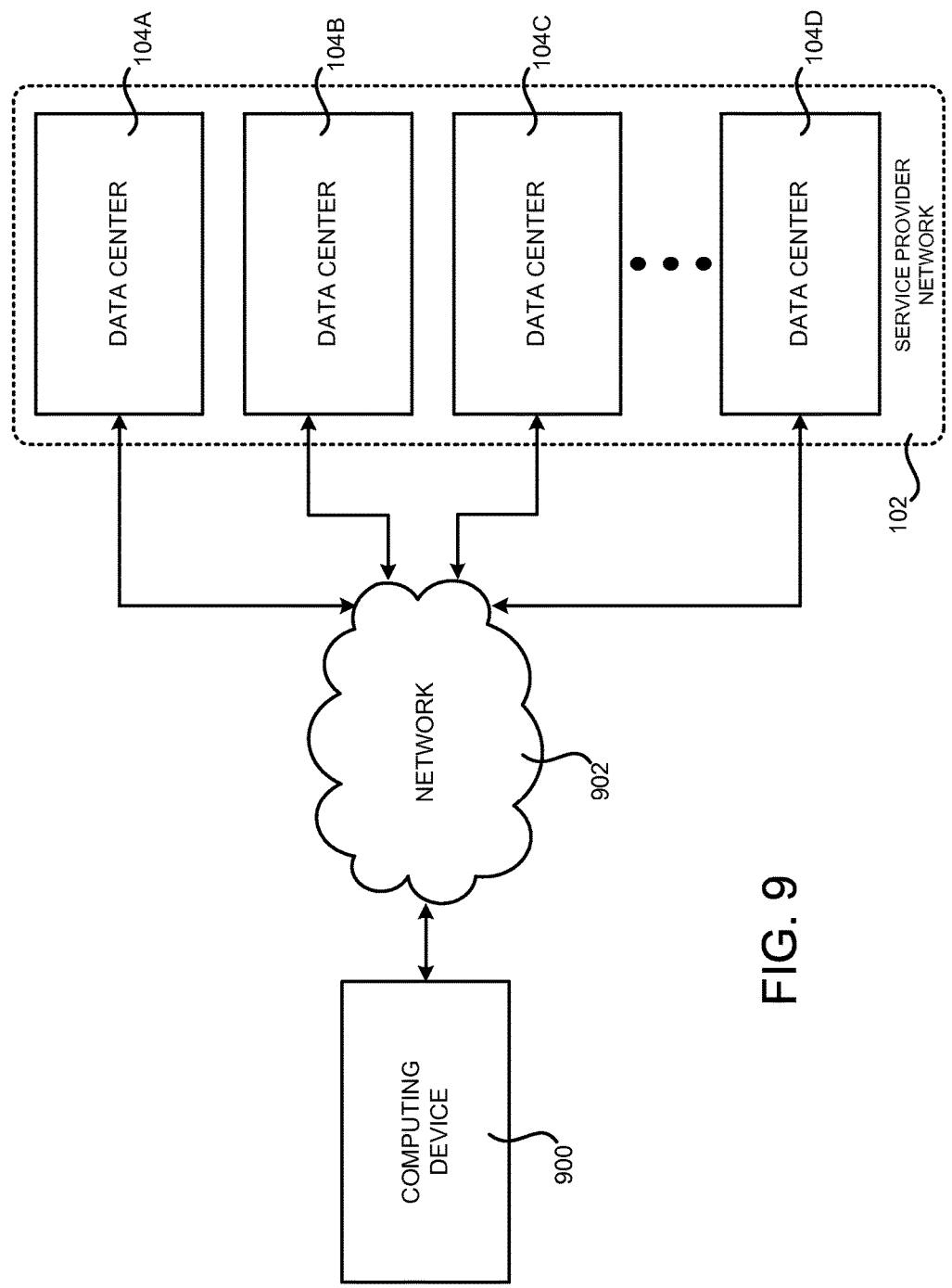
FIG. 9 is a system and network diagram that shows an illustrative operating environment that includes a service provider network that may be configured to implement aspects of the functionality described herein.

FIG. 9 is a system and network diagram that shows one illustrative operating environment for the configurations disclosed herein that includes a service provider network 102 that may be configured to provide functionality for asynchronously providing resource status data 122 in the manner described above, according to one configuration disclosed herein. As discussed above, the service provider network 102 can execute network services 106 that provide computing resources 108 on a permanent or an as-needed basis. Among other types of functionality, the computing resources 108 provided by the service provider network 102 can be utilized to implement the various services described above. As also discussed above, the computing resources 108 provided by the service provider network 102 may include various types of computing resources, such as data processing resources like VM instances, data storage resources, networking resources, data communication resources, network services, and the like.

Each type of computing resource 108 provided by the service provider network 102 may be general-purpose or may be available in a number of specific configurations. For example, data processing resources may be available as physical computers or VM instances in a number of different configurations. The VM instances may be configured to execute applications, including web servers, application servers, media servers, database servers, some or all of the services described above, and/or other types of programs. Data storage resources may include file storage devices, block storage devices, and the like. The service provider network 102 might also be configured to provide other types of computing resources 108 not mentioned specifically herein.

As also discussed above, the computing resources 108 provided by the service provider network 102 are enabled in one implementation by one or more data centers 104A-104D (which may be referred herein singularly as "a data center 104" or in the plural as "the data centers 104"). The data centers 104 are facilities utilized to house and operate computer systems and associated components. The data centers 104 typically include redundant and backup power, communications, cooling, and security systems. The data centers 104 might also be located in geographically disparate locations. One illustrative configuration for a data center 104 that might be utilized to implement the technologies disclosed herein will be described below with regard to FIG. 10.

The customers and other users of the service provider network 102 may access the computing resources 108 provided by the service provider network 102 over a network 902, which may be a wide area communication network ("WAN"), such as the Internet, an intranet or an Internet service provider ("ISP") network or a combination of such networks. For example, and without limitation, a computing device 900 operated by a customer or other user of the service provider network 102, such as the customer computer 114, might be utilized to access the service provider network 102 by way of the network 902. It should be appreciated that a local-area network ("LAN"), the Internet, or any other networking topology known in the art that connects the data centers 104 to remote customers and other users may be utilized. It should also be appreciated that combinations of such networks might also be utilized.

Figure 10:
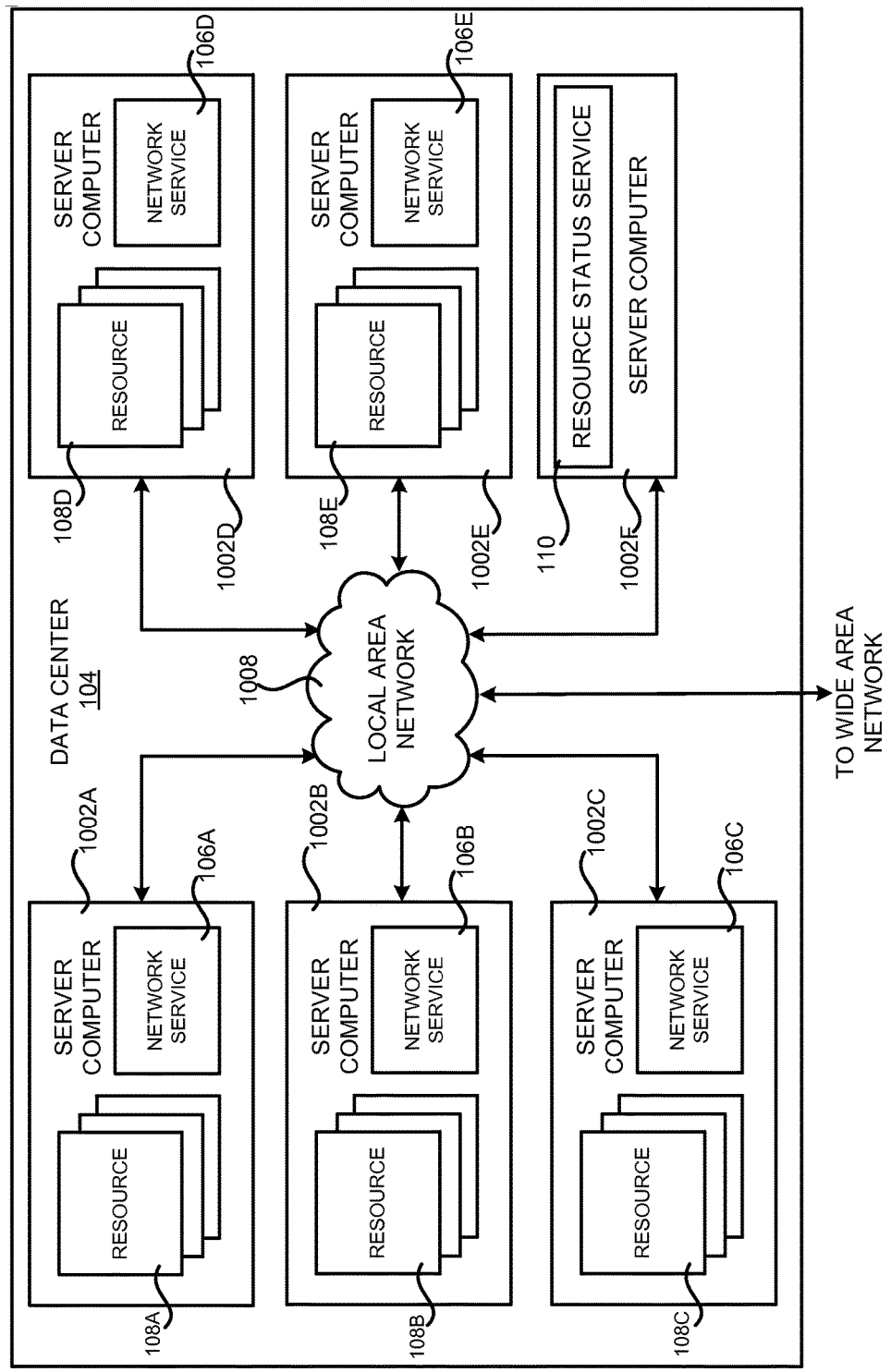
FIG. 10 is a computing system diagram illustrating a configuration for a data center that may be utilized to implement aspects of the technologies disclosed herein.

FIG. 10 is a computing system diagram that illustrates one configuration for a data center 104 that implements aspects of the technologies disclosed herein for asynchronously providing resources status data 122. The example data center 104 shown in FIG. 10 includes several server computers 1002A-1002F (which may be referred to herein singularly as "a server computer 1002" or in the plural as "the server computers 1002") for providing computing resources 108A-108E.

The server computers 1002 may be standard tower, rackmount, or blade server computers configured appropriately for providing the computing resources 108 described herein (illustrated in FIG. 10 as the computing resources 108A-108E). As mentioned above, the computing resources provided by the service provider network 102 might be data processing resources such as VM instances or hardware computing systems, data storage resources, database resources, networking resources, and others. Some of the servers 1002 might also be configured to execute network services 106A-106E, respectively, capable of instantiating, providing and/or managing the computing resources 108, some of which are described in detail below with regard to FIG. 11.

The data center 104 shown in FIG. 10 also includes a server computer 1002F that may execute some or all of the software components described above. For example, and without limitation, the server computer 1002F might be configured to execute the resource status service 110, which was described in detail above. The server computer 1002F might also be configured to execute other components and/or to store data for providing some or all of the functionality described herein. In this regard, it should be appreciated that the resource status service 110 might execute on many other physical or virtual servers in the data centers 104 in various configurations.

In the example data center 104 shown in FIG. 10, an appropriate LAN 1008 is also utilized to interconnect the server computers 1002A-1002F. The LAN 1008 is also connected to the network 902 illustrated in FIG. 9. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 104A-104N, between each of the server computers 1002A-1002F in each data center 104, and, potentially, between computing resources 108 in each of the data centers 104. It should be appreciated that the configuration of the data center 104 described with reference to FIG. 10 is merely illustrative and that other implementations might be utilized.

Figure 11:
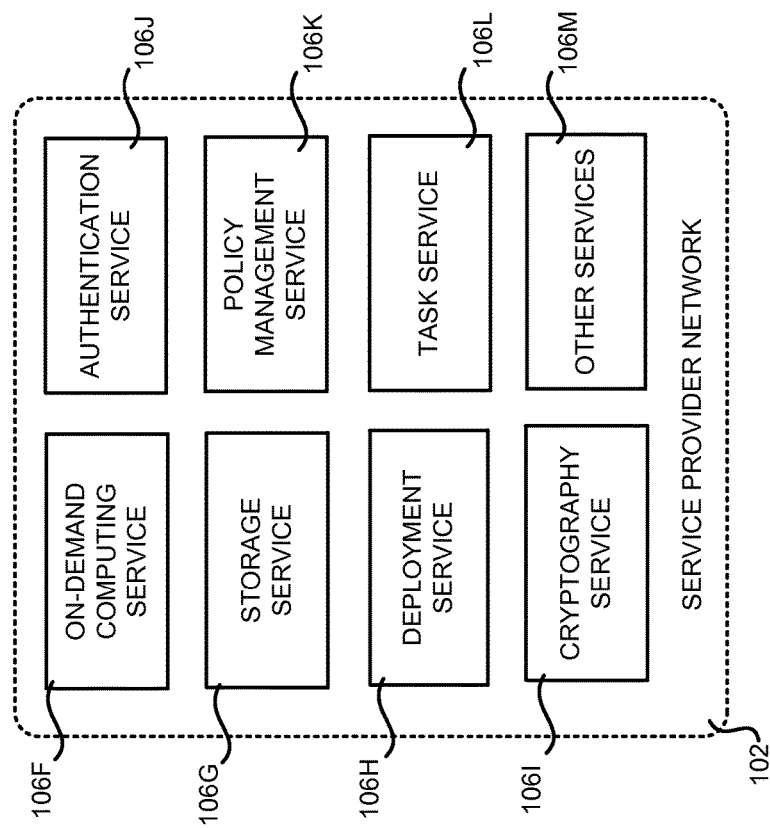
FIG. 11 is a system and network diagram that shows aspects of several services that might be provided by and utilized within a service provider network in one configuration disclosed herein.

FIG. 11 is a system and network diagram that shows aspects of several network services 206 that might be provided by and utilized within a service provider network 102 in one configuration disclosed herein. In particular, and as discussed above, the service provider network 102 may provide a variety of network services 106 to customers and other users of the service provider network 102 including, but not limited to, an on-demand computing service 106F. The service provider network 102 might also provide other types of services including, but not limited to, a storage service 106G, a deployment service 106H, a cryptography service 106I, an authentication service 106J, a policy management service 106K, and/or a task service 106L, each of which is described in greater detail below. Additionally, the service provider network 102 might also provide other services 106M, some of which are described in greater detail below.

It should be appreciated that customers of the service provider network 102 may include organizations or individuals that utilize some or all of the services 106 provided by the service provider network 102. As described above, a customer or other user may communicate with the service provider network 102 through a network, such as the network 902 shown in FIG. 9. Communications from a customer computing device, such as the customer computer 114 shown in FIG. 1, to the service provider network 102 may cause the services 106 provided by the service provider network 102 to operate in accordance with the described configurations or variations thereof.

It is noted that not all configurations described include the services described with reference to FIG. 11 and that additional services 106 may be provided in addition to or as an alternative to the services 106 explicitly described herein. Each of the services 106 shown in FIG. 11 might also expose web service interfaces that enable a caller to submit appropriately configured API calls to the various services through web service requests. For example, and without limitation, the services 106 might expose APIs through which the resource status service 110 can request resource status data 122 from the services 106. In addition, each of the services 106 might include service interfaces that enable the services 106 to access each other (e.g., to enable a virtual computer system provided by the on-demand computing service 106F to store data in or retrieve data from the data storage service 106G). Additional details regarding some of the services shown in FIG. 11 will now be provided.

As discussed above, the on-demand computing service 106F may be a collection of computing resources configured to instantiate VM instances and to provide other types of computing resources 108 on demand. For example, a customer or other user of the service provider network 102 may interact with the on-demand computing service 106F (via appropriately configured and authenticated API calls) to provision and operate VM instances that are instantiated on physical computing devices hosted and operated by the service provider network 102. The VM instances may be used for various purposes, such as to operate as servers supporting a web site, to operate business applications or, generally, to serve as computing resources for the customer. Other applications for the VM instances may be to support database applications, electronic commerce applications, business applications and/or other applications. Although the on-demand computing service 106F is shown in FIG. 11, any other computer system or computer system service may be utilized in the service provider network 102, such as a computer system or computer system service that does not employ virtualization and instead provisions computing resources on dedicated or shared computers/servers and/or other physical devices.

The storage service 106G might include software and computing resources that collectively operate to store data using block or file-level storage devices (and/or virtualizations thereof). The storage devices of the storage service 106G might, for instance, be operationally attached to virtual computer systems provided by the on-demand computing service 106F to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 106I. The cryptography service 106I may utilize storage services of the service provider network 102, such as the storage service 106G, to store encryption keys in encrypted form, whereby the keys may be usable to decrypt customer keys accessible only to particular devices of the cryptography service 106I. The cryptography service 106I might also provide other types of functionality not specifically mentioned herein.

As illustrated in FIG. 11, the service provider network 102, in various configurations, also includes an authentication service 106J and a policy management service 106K. The authentication service 106J, in one example, is a computer system (i.e., collection of computing resources 108) configured to perform operations involved in authentication of users. For instance, one of the services 106 shown in FIG. 11 may provide information from a user to the authentication service 106J to receive information in return that indicates whether or not the requests submitted by the user are authentic.

The policy management service 106K, in one example, is a network service configured to manage policies on behalf of customers or internal users of the service provider network 102. The policy management service 106K may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 106L. The task service 106L is configured to receive a task package and to enable executing tasks as dictated by the task package. The task service 106L may be configured to use any resource 108 of the service provider network 102, such as instantiated virtual machines or virtual hosts, for executing the task. The task service 106L may configure the instantiated virtual machines or virtual hosts to operate using a selected operating system and/or a selected execution application in accordance with specified requirements.

The service provider network 102 may additionally maintain other services 106M based, at least in part, on the needs of its customers. For instance, the service provider network 102 may maintain a deployment service 106H for deploying program code and/or a database service (not shown in FIG. 11) in some configurations. A database service may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. Other services include object-level archival data storage services, and services that manage, monitor, interact with, or support other services. The service provider network 102 might also be configured with other network services 106 not specifically mentioned herein in other configurations.

Figure 12:
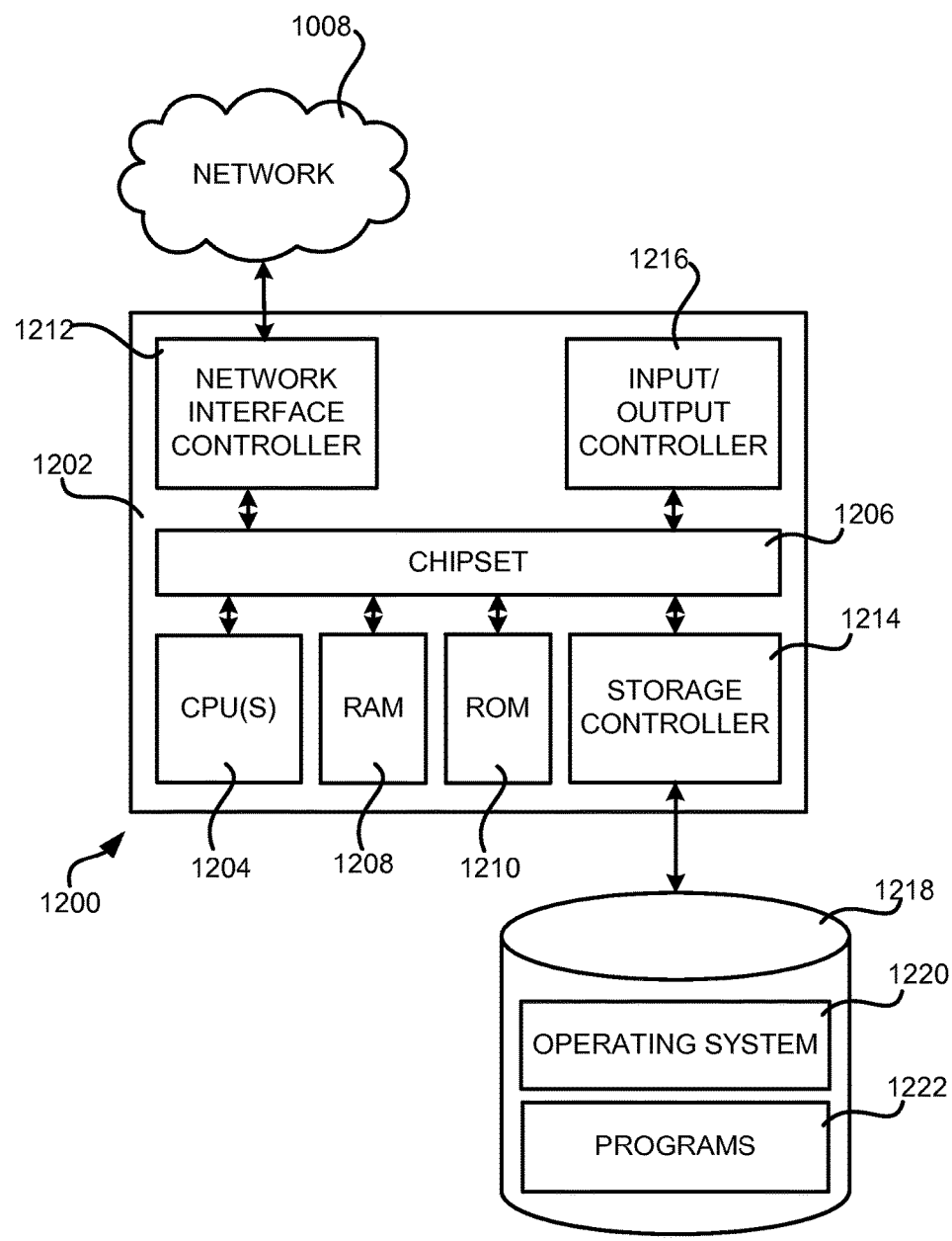
FIG. 12 is a computer architecture diagram showing an illustrative computer hardware architecture for implementing a computing device that might be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and may be utilized to execute any of the software components presented herein.

The computer 1200 includes a baseboard 1202, or "motherboard," which is a printed circuit board to which a multitude of components or devices may be connected by way of a system bus or other electrical communication paths. In one illustrative configuration, one or more central processing units ("CPUs") 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the computer 1200. The chipset 1206 may further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM may also store other software components necessary for the operation of the computer 1200 in accordance with the configurations described herein.

The computer 1200 may operate in a networked environment using logical connections to remote computing devices and computer systems through a network, such as the network 606. The chipset 1206 may include functionality for providing network connectivity through a NIC 1212, such as a gigabit Ethernet adapter. The NIC 1212 is capable of connecting the computer 1200 to other computing devices over the network 606. It should be appreciated that multiple NICs 1212 may be present in the computer 1200, connecting the computer to other types of networks and remote computer systems.

The computer 1200 may be connected to a mass storage device 1218 that provides non-volatile storage for the computer. The mass storage device 1218 may store an operating system 1220, programs 1222, and data, which have been described in greater detail herein. The mass storage device 1218 may be connected to the computer 1200 through a storage controller 1214 connected to the chipset 1206. The mass storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 may store data on the mass storage device 1218 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1218 is characterized as primary or secondary storage, and the like.

For example, the computer 1200 may store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1218 by detecting the physical states or characteristics of one or more particular locations within the physical storage units.

In addition to the mass storage device 1218 described above, the computer 1200 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1200.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 may store an operating system 1220 utilized to control the operation of the computer 1200. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 1218 may store other system or application programs and data utilized by the computer 1200.

In one configuration, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above with regard to FIGS. 1-8. The computer 1200 might also include computer-readable storage media for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, an input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for asynchronously providing resource status data have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:
1. An apparatus, comprising:
   a processor; and
   a non-transitory computer-readable storage medium having instructions stored thereupon which are executable by the processor and which, when executed, cause the apparatus to:
      receive a first request for resource status data for computing resources provided by network services executing in a plurality of data centers in a service provider network;
      in response to receipt of the first request, transmit one or more synchronous requests for the resource status data to the network services and provide a reply to the first request, wherein the reply to the first request comprises an identifier corresponding to the resource status data, and wherein the reply to the first request is provided without at least some of the requested resource status data;
      receive a second request for the resource status data, the second request comprising the identifier corresponding to the resource status data;
      in response to receipt of the second request, utilize the identifier to determine whether all of the resource status data is stored in a cache; and in response to a determination that all of the resource status data is stored in the cache, returning the resource status data in reply to the second request.

2. The apparatus of claim 1, wherein the reply to the first request further comprises data specifying a time period that is to elapse prior to transmission of the second request.

3. The apparatus of claim 1, wherein the non-transitory computer-readable storage medium has further instructions stored thereupon to, in response to determining that all of the resource status data is not stored in the cache, generate a reply to the second request specifying a time period that is to elapse prior to transmission of a third request.

4. The apparatus of claim 1, wherein the first request for the resource status data is received at a first instance of a network service and wherein the second request for the resource status data is received at a second instance of the network service.

5. The apparatus of claim 4, wherein the non-transitory computer-readable storage medium has further instructions stored thereupon to receive the resource status data from the network services and to store the resource status data in the cache, and wherein the cache is accessible to the first instance of the network service and the second instance of the network service.

6. The apparatus of claim 2, wherein the first request for the resource status data and the second request for the resource status data are received from a resource status application configured to generate the first request for the resource status data, to receive the reply to the first request for the resource status data, and to wait the time period before transmitting the second request for the resource status data.

7. A non-transitory computer-readable storage medium having instructions stored thereupon which are executable by the processor and which, when executed, cause the processor to:
receive a first request for status data associated with computing resources provided by network services executing in a service provider network;
in response to receipt of the first request, transmit one or more requests for the status data to the network services and provide a reply to the first request, wherein the reply to the first request comprises an identifier, and wherein the reply to the first request is provided without at least some of the requested status data;
receive a second request for the status data, the second request comprising the identifier;
in response to receipt of the second request, determine whether at least a portion of the status data is stored in a cache; and
in response to a determination that at least the portion of the status data is stored in the cache, return the portion of the status data stored in the cache in reply to the second request.

8. The non-transitory computer-readable storage medium of claim 7, wherein a first of the computing resources is provided by a network service executing in a first data center, wherein a second of the computing resources is provided by a network service executing in a second data center, and wherein the first data center and the second data centers are located in different geographic regions.

9. The non-transitory computer-readable storage medium of claim 7, wherein the reply to the first request further comprises data defining a time period that is to elapse prior to transmission of the second request.

10. The non-transitory computer-readable storage medium of claim 7, having further instructions stored thereupon to:
receive a third request for the status data, the third request comprising the identifier;
in response to receiving the third request, determine whether a second portion of the status data is stored in the cache; and
in response to determining that the second portion of the status data is stored in the cache, returning the second portion of the status data stored in the cache in reply to the third request for the status data.

11. The non-transitory computer-readable storage medium of claim 7, wherein the reply to the third request for the status data specifies a time period that is to elapse prior to transmission of a fourth request for the status data.

12. The non-transitory computer-readable storage medium of claim 7, wherein the reply to the first request comprises the status data if the status data is received from the network services within a threshold period of time after receiving the first request.

13. The non-transitory computer-readable storage medium of claim 7, having further instructions stored thereupon to receive the status data from the network services and to store the status data in the cache, and wherein the cache is assessable to multiple instances of a service configured to receive the first request for status data and the second request for the status data.

14. The non-transitory computer-readable storage medium of claim 7, wherein the first request and the second request are received from a resource status application configured to display a graphical user interface (GUI) comprising the status data.

15. A computer-implemented method for asynchronous provision of status data, the method comprising:
receiving a first request for the status data, the status data associated with one or more computing resources provided by network services executing in a service provider network;
in response to receiving the first request, transmitting one or more requests for the status data to the network services and providing a reply to the first request, wherein the reply to the first request comprises an identifier, and wherein the reply to the first request is provided without at least some of the requested status data;
receiving a second request for the status data, the second request comprising the identifier;
determining in response to the second request whether at least a portion of the status data is stored in a cache; and
in response to determining that at least the portion of the status data is stored in the cache, returning the portion of the status data stored in the cache in reply to the second request.

16. The computer-implemented method of claim 15, wherein the reply to the first request further comprises data describing a time period that is to elapse prior to transmission of the second request for the status data.

17. The computer-implemented method of claim 15, wherein the reply to the second request further comprises data describing a time period that is to elapse prior to transmission of a third request for the status data.

18. The computer-implemented method of claim 15, further comprising:
receiving a third request for the status data, the third request comprising the identifier;

in response to receiving the third request, determining whether a second portion of the status data is stored in the cache; and in response to determining that the second portion of the status data is stored in the cache, returning the second portion of the status data stored in the cache in reply to the third request for the status data.

19. The computer-implemented method of claim 15, wherein a first of the computing resources is provided by a network service executing in a first data center, wherein a second of the computing resources is provided by a network service executing in a second data center, and wherein the first data center and the second data centers are located in different geographic regions.

20. The computer-implemented method of claim 16, wherein the first request for the status data and the second request for the status data are received from a resource status application configured to receive the reply to the first request for the status data, and to wait the time period before transmitting the second request for the status data.

* * * * *